United States Patent [19]

Hamasaki

[11] Patent Number: 5,528,430
[45] Date of Patent: Jun. 18, 1996

[54] ROTATABLE RING SUPPORTING MECHANISM IN LENS BARREL

[75] Inventor: Takuji Hamasaki, Tokyo, Japan

[73] Assignee: Asahi Kogaku Kogyo Kabushiki Kaisha, Tokyo, Japan

[21] Appl. No.: 301,773

[22] Filed: Sep. 7, 1994

[30] Foreign Application Priority Data

Sep. 8, 1993 [JP] Japan .................. 5-048806 U

[51] Int. Cl.[6] .............................. G02B 15/14; G02B 7/02
[52] U.S. Cl. ........................ 359/701; 359/704; 359/826
[58] Field of Search .................................. 359/701, 700, 359/704, 706, 826

[56] References Cited

U.S. PATENT DOCUMENTS

| | | | |
|---|---|---|---|
| 3,698,254 | 10/1972 | Bradt | 359/701 |
| 4,269,479 | 5/1981 | Hamatani | 359/704 |
| 4,496,217 | 1/1985 | Aoyagi | 359/823 |
| 4,640,579 | 2/1987 | Takizawa | 359/826 |
| 4,645,310 | 2/1987 | Kohmoto | 359/706 |
| 5,066,965 | 11/1991 | Tanaka | 354/64 |

Primary Examiner—Georgia Y. Epps
Assistant Examiner—Ricky Mack
Attorney, Agent, or Firm—Greenblum & Bernstein

[57] ABSTRACT

A supporting mechanism rotatably supports a rotatable ring on a cylindrical member in a lens barrel and includes a frictional member which is made from a member separate from the rotatable ring and the cylindrical member. The frictional member is provided on one of the rotatable ring and the stationary cylindrical member so as to come into sliding contact with the other of the stationary cylindrical member and the rotatable ring in a thrust direction.

12 Claims, 3 Drawing Sheets

5,528,430

ROTATABLE RING SUPPORTING MECHANISM IN LENS BARREL

BACKGROUND OF THE INVENTION

1. Field of the Invention

The present invention relates to a supporting mechanism in which a rotatable operation ring is rotatably supported by a cylindrical member in a lens barrel.

2. Description of Related Art

In a known lens barrel, there are various rotating rings including a zooming ring, a focusing ring, a diaphragm setting ring, etc. These rotating operation rings must be correctly fitted in or on respective support members without any play, so that the rotating rings can be smoothly rotated with an appropriate rotation torque while an operator physically feels the rotational movement thereof. The precise fitting, the easy adjustment of the rotational torque and the provision of a feeling of the rotational movement are particularly important for the zooming ring, since the latter is rotated so as to independently move at least two front and rear variable power lens groups in the optical axis direction by a relatively large displacement.

To this end, in a conventional zooming ring, the rotational torque is adjusted by an adjustment of a clearance between a cam groove formed on a cam ring, which is rotated together with the zooming ring and a roller fitted in the cam groove, and a selection of lubricant to be applied to the rotating and fitting portion of the cam ring. It is also known to provide a biasing member between the zooming ring and the stationary cylindrical member to bias the zooming ring in the radial direction to thereby adjust the play of the rotating and fitting portion and the rotational torque. However, the adjustment of the clearance between the cam groove and the roller fitted therein and the selection of the lubricant can not ensure a stable operation of the action of the zooming ring. Moreover, the biasing member in the radial direction sometimes conversely increases the play of the fitting portion.

SUMMARY OF THE INVENTION

The primary object of the present invention is to provide a supporting mechanism for a rotatable ring in which the latter can be easily and certainly actuated.

To achieve the object mentioned above, according to the present invention, there is provided a supporting mechanism which rotatably supports a rotatable operation ring with respect to a cylindrical member in a lens barrel. The mechanism includes a frictional member made as an element, member or piece separate from the rotatable operation ring and the cylindrical member, and provided on the rotatable ring and the cylindrical member to come into sliding contact with the other cylindrical member or rotatable operation ring in a thrust direction.

The frictional member can be inserted and fitted in dove-tail grooves formed in an inner peripheral surface of the rotatable ring in a direction parallel with the optical axis. The frictional member can be provided, on an outer surface thereof, with a contact portion which comes into contact with the cylindrical member.

The frictional member can be made of synthetic resin, preferably, POM (polyacetals) to provide an improved feeling of the rotational movement of the rotatable ring and enhance the operational efficiency thereof.

According to another aspect of the present invention, there is provided a zoom lens barrel comprising a cylindrical member, a zooming ring which is rotatably fitted to the outside of the cylindrical member, a frictional member made from a separate piece from the rotatable zooming ring and the cylindrical member, and a dove-tail groove provided in an inner peripheral surface of the zooming ring in a direction parallel with the optical axis. The dove-tail groove is located at one end of the zooming ring and has an open end through which the frictional member is inserted. Thus, an outer end, of the frictional member is in contact with the cylindrical member.

The present disclosure relates to subject matter contained in Japanese utility model application No. 05-48806 (filed on Sep. 8, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
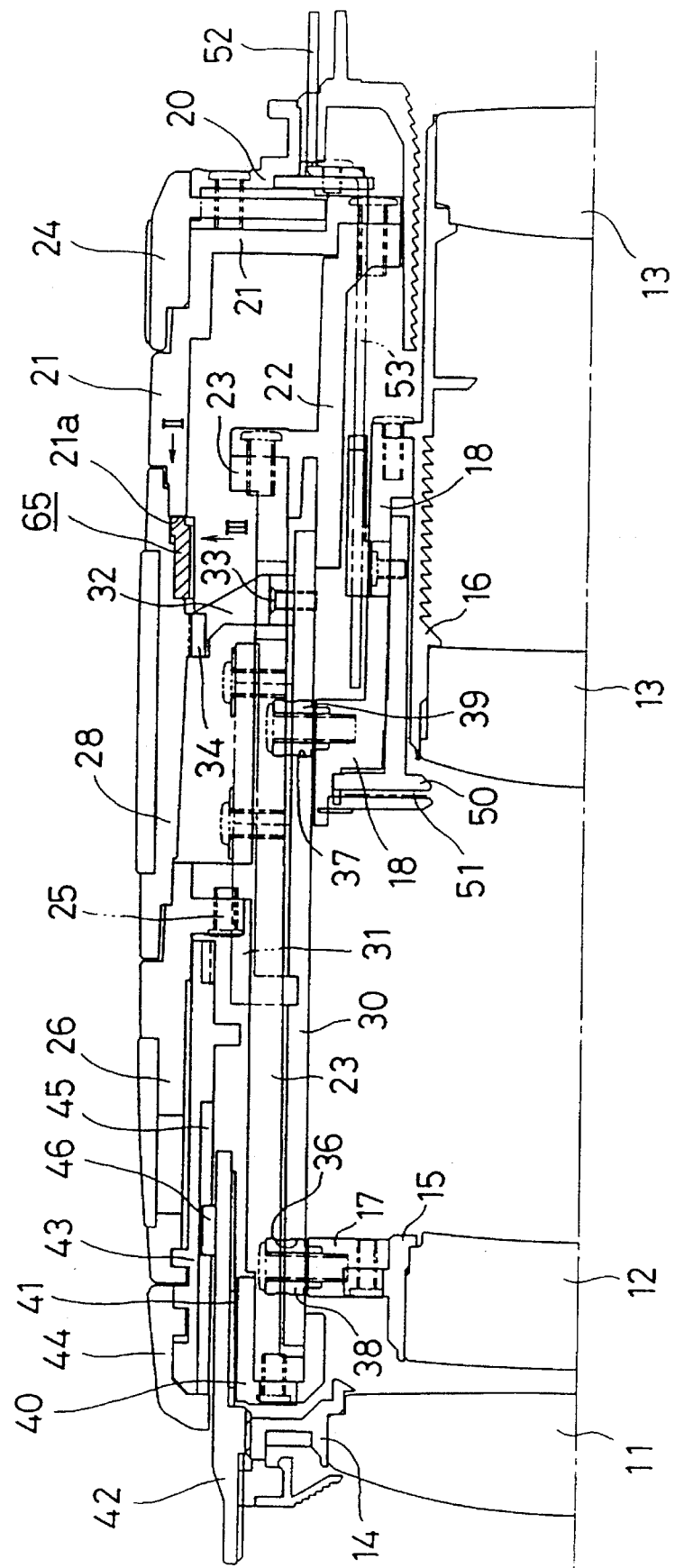
FIG. 1 is a sectional view of an upper half of a supporting mechanism of a rotatable member in a lens barrel, according to the present invention.
Figure 2:
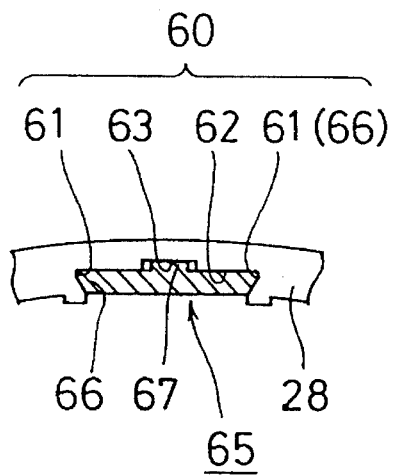
FIG. 2 is an end view of a frictional member, viewed from the direction indicated at an arrow II in FIG. 1.
Figure 3:
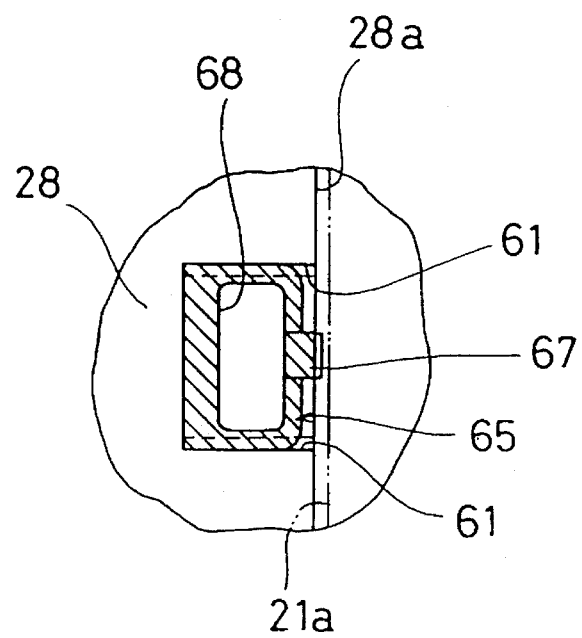
FIG. 3 is a bottom view of a frictional member, viewed from the direction indicated at an arrow III in FIG. 1.

The whole structure of a zoom lens barrel will be discussed below. In the illustrated embodiment, the lens system is comprised of three lens groups including a first lens group 11, a second lens group 12, and a third lens group 13.

The first lens group 11 constitutes a focusing lens group; and the second and third lens groups 12 and 13 constitute a variable power lens group. The first, second and third lens groups 11, 12 and 13 are respectively supported by a first lens frame 14, a second lens frame 15 and a third lens frame 16. The second lens frame 15 and the third lens frame 16 are respectively secured to a second lens moving frame 17 and a third lens moving frame 18.

A connecting ring 21 (stationary cylindrical member) is secured to a mount ring 20 which is detachably attached to a camera body. A first inner stationary cylinder 22 and a second inner stationary cylinder 23 are successively secured to the connecting ring 21. There is a diaphragm setting ring 24 which is rotatably supported between the mount ring 20 and the connecting ring 21.

A zooming ring 28 is rotatably supported between the front end of the connecting ring 21 and a rear end of an outer barrel 26 which is secured to the second inner stationary cylinder 23 by a machine screw 25. A cam ring 30 is rotatably fitted in the second inner stationary cylinder 23. The movement of the cam ring 30 in the optical axis direction is restricted by an FB adjusting lever 31. The cam ring 30 is provided, on the outer peripheral surface of the rear end thereof, with a zoom lever 32 secured thereto by a screw 33. The zoom lever 32 is engaged at the outer end thereof by a circumferential engaging portion 34 formed on the inner peripheral surface of the zooming ring 28, so that the zooming ring 28 and the cam ring 30 can be always rotated by the same angular displacement.

The cam ring 30 is provided with cam grooves 36 and 37. A cam pin 38 secured to the second lens moving frame 17 is fitted in the cam groove 36 and a cam pin 39 secured to the third lens moving frame 18 is fitted in the cam groove 37, respectively. The cam pins 38 and 39 are fitted in a linear movement guide groove (not shown) formed in the second inner stationary cylinder 23 and extending parallel with the optical axis. Consequently, when the cam ring 30 is rotated through the zooming ring 28, the linear movement of the second lens group 12 and the third lens group 13 in the optical axis direction takes place in accordance with the cam profile of the cam grooves 36 and 37 to thereby carry out the zooming.

A stationary helicoid ring 40 is secured to the front end of the second inner stationary cylinder 23. The helicoid ring 40 is screw-engaged by a decorative frame 42 to which the first lens frame 14 is secured through a helicoid 41.

The outer barrel 26 rotatably supports a focus rotation ring 43 to which the focusing ring 44 is connected. The focus rotation ring 43 is provided with a rotation transmitting groove 45 extending in the optical axis direction, so that a radial projection 46 provided on the decorative frame 42 is fitted in the rotation transmitting groove 45. Consequently, when the focusing ring 44 is rotated, the decorative frame 42 (first lens group 11) is moved through the focus rotation ring 43, the rotation transmitting groove 45 and the radial projection 46, in the optical axis direction, while rotating in accordance with the helicoid 41 to effect the zooming.

The third lens moving frame 18 rotatably supports a diaphragm opening and closing ring 50 which is rotated to vary the aperture through diaphragm blades 51. The diaphragm opening and closing ring 50 is rotated through a release lever 52 and a diaphragm lever 53, that are both rotated in accordance with diaphragm signals sent from the camera body, or through the diaphragm setting ring 24.

The present invention is applied for example to the zooming ring 28 of the zoom lens barrel as constructed above. The zooming ring 28 is provided, on the inner peripheral surface of the rear end thereof, with a plurality of (e.g., three) frictional member receiving portions 60 spaced at a predetermined distance in the circumferential direction. Each of the frictional member receiving portions 60 is provided with a pair of right and left dove-tail grooves 61 having open recesses 62 at the rear ends thereof. Deep groove portions 63 are formed at the intermediate portions of the open recesses 62.

The frictional member 65 held in each frictional member receiving portion 60 is of a generally rectangular shape in plan view and is provided with acute angled inserting portions 62 to be inserted in the corresponding dove-tail grooves 61 and a frictionally sliding contact portion 67 fitted in the deep groove portion 63. To increase the elastic deformability of the frictionally sliding contact portion 67, a generally rectangular opening 68 is formed at the center of the frictional member 65. The frictionally sliding contact portion 67 slightly protrudes toward the front end surface 21a of the connecting ring 21 from the end face 28a of the zooming ring 28 that is opposed to the front end surface 21a when the frictional member 65 is fully inserted in the receiving portion 60 from the rear end of the zooming ring 28. The frictional members 65 are made of POM, as mentioned above.

After the components other than the outer barrel 26 and the zooming ring 28 are assembled, the zooming ring 28 is fitted onto the outer periphery of the front end of the connecting ring 21, while engaging the circumferential engaging portion 34 with the zoom lever 32. Thereafter, the outer barrel 26 is secured to the second inner stationary cylinder 23 by the screw 25, and the zooming ring 28 is rotatably supported between the connecting ring 21 and the outer barrel 26. The frictional members 65 are received in advance in the corresponding frictional member receiving portions 60. Consequently, the frictionally sliding contact portions 67 of the frictional members 65 are brought into elastic contact with the front end 21a of the connecting ring 21, so that the front end 21a does not contact with the opposed end 28a of the zooming ring 28.

In this state, when the zooming ring 28 is rotated, the frictionally sliding contact portions 67 of the frictional members 65 are brought into sliding contact with the front end 21a of the connecting ring 21. Since the frictional members 65 have a good friction property, the operator can feel the rotational movement of the zooming ring 28, and play or clearance of the fitting, particularly that in the axial direction, can be eliminated. It is possible to prepare frictional members 65 having the frictionally sliding contact portions 67 of different amounts of protrusion, so that the frictional members 65 can be selectively used depending on the desired feeling of the rotational movement of the zooming ring 28. When the zooming ring 28 is rotated, the cam ring 30 is rotated to effect the zooming, as mentioned above.

Although the frictional members 65 are provided on only one end of the zooming ring 28 in the illustrated embodiment, it is possible to provide the frictional members 65 on both of the opposed ends of the zooming ring 28. Alternatively, it is also possible to provide the frictional members 65 on the connecting ring 21 and/or the outer barrel 26 to obtain the same effect.

Figure 5:
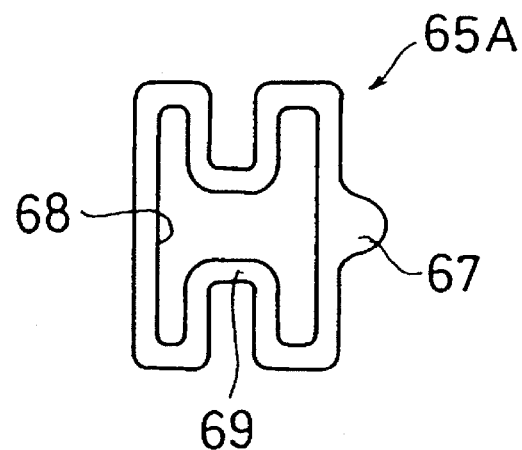
FIG. 5 is a plan view of still another embodiment of a frictional member according to the present invention; and, FIG. 6 is a sectional view of main parts of the a supporting mechanism of a rotatable member in a lens barrel, according to another embodiment of the present invention.
Figure 6:
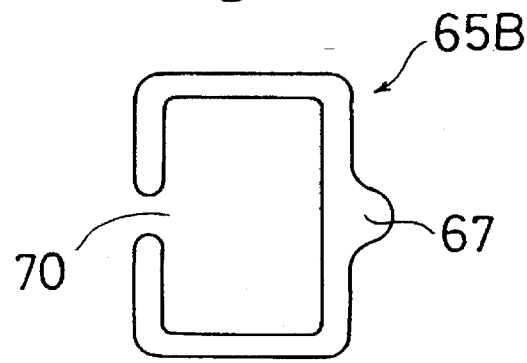

The frictional members 65 are not limited to a specific shape. FIGS. 5 and 6 show two different examples of the frictional members 65. The frictional member 65A shown in FIG. 5 is provided on the intermediate portion thereof with bent portions 69 which decrease the spring constant (elastic deformability) of the frictional member 65A. The frictional member 65B shown in FIG. 6 is provided with a cut-away portion 70 on the side opposite to the sliding contact portion 67 thereof to decrease the spring constant (elastic deformability) of the frictional member 65B.

Figure 4:
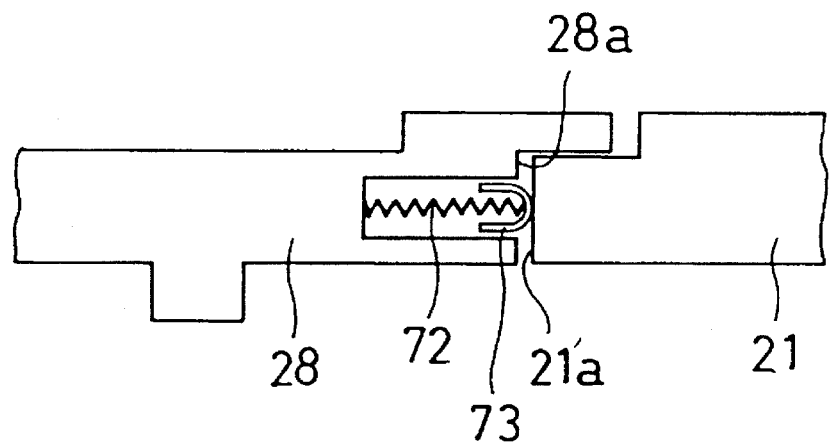
FIG. 4 is a plan view of another embodiment of a frictional member according to the present invention.

FIG. 4 shows a modified embodiment of the present invention, in which the biasing member is constituted by a coil spring 72 which is provided on the front end thereof with a frictional member 73 made of synthetic resin.

As can be understood from the above discussion, according to the present invention, since the stationary cylindrical member is brought into sliding contact with the frictional members in the thrust direction when the rotatable operation ring of the lens barrel is rotated, not only can the play or clearance between the stationary cylindrical member and the rotatable operation ring be reduced, but also the feeling of the rotational movement of the rotatable operation ring can be improved. Since the frictional members are made as a piece (or an element) separate from the stationary cylindrical member and the rotatable operation ring, and are supported by the stationary cylindrical member and the rotatable operation ring, the zoom lens barrels have substantially the same quality, thus resulting in stable operation, improved feeling of the rotational movement, and constant rotational torque thereof.

I claim:

1. A supporting mechanism which rotatably supports a rotatable ring by a stationary cylindrical member in a lens barrel, comprising:

a frictional member made of a piece separate from said rotatable ring and the stationary cylindrical member;

means for supporting said frictional member provided such that said frictional member comes into sliding contact with said stationary cylindrical member in a thrust direction; and said means for supporting including a guide groove formed in a surface of said rotatable ring in a direction parallel with an optical axis, and said frictional member having a contact portion on its outer end which contacts said stationary cylindrical member.

2. A supporting mechanism according to claim 1, wherein said guide groove is comprised of a plurality of dove-tail grooves.

3. A supporting mechanism according to claim 1, wherein said frictional member is made from a material which is a member of the group of polyacetals.

4. A supporting mechanism according to claim 1, wherein said lens barrel is a zoom lens barrel, and the rotatable operation ring is a zooming ring.

5. A zoom lens barrel comprising;

a cylindrical member;

a zooming ring which is rotatably fitted to an outside of said cylindrical member;

a frictional member made of a piece separate from said rotatable zooming ring and said cylindrical member, and a dove-tail groove provided in an inner peripheral surface of said zooming ring and extending in a direction parallel with a optical axis, said dove-tail groove being located at one end of said zooming ring and having an open end through which said frictional member is inserted, an outer end of said frictional member being in contact with said cylindrical member.

6. A supporting mechanism according to claim 5, wherein the cylindrical member is a stationary member.

7. A supporting mechanism according to claim 1, said guide groove being formed in an inner peripheral surface of said rotatable ring.

8. A supporting mechanism which rotatably supports a manually rotatable ring by a stationary cylindrical member in a lens barrel, comprising:

at least one frictional member distinct from said manually rotatable ring and said stationary cylindrical member;

means for supporting said frictional member provided on one of said manually rotatable ring and said stationary cylindrical member such that said frictional member comes into sliding contact with the other of said stationary cylindrical member and said manually rotatable ring in a direction along a longitudinal axis of said stationary cylindrical member; and said frictional member having a contact portion on an outer end which fictionally engages said other of said stationary cylindrical member and said manually rotatable ring to provide a friction force against rotation of said manually rotatable ring by a user.

9. The supporting mechanism of claim 8, wherein said at least one frictional member is a plurality of frictional members spaced apart along a circumference of said one of said manually rotatable ring and said stationary cylindrical member.

10. A supporting mechanism which supports a rotatable ring for rotation with respect to a stationary cylindrical member in a lens barrel, each of said rotatable ring and said stationary cylindrical member comprising a cylindrical surface and a surface extending transversely with respect to said cylindrical surface, said supporting mechanism comprising:

at least one frictional member distinct from said rotatable ring and said stationary cylindrical member;

means for supporting said frictional member provided on one of said rotatable ring and said stationary cylindrical member such that said frictional member comes into sliding contact with the transversely extending surface of the other of said stationary cylindrical member and said rotatable ring; and said frictional member having a contact portion on an outer end which fictionally contacts the transversely extending surface of said other of said stationary cylindrical member and said rotatable ring to provide a resistance against rotation of said rotatable ring.

11. The supporting mechanism according to claim 10, said transversely extending surface being substantially perpendicular to said cylindrical surface.

12. The supporting mechanism according to claim 10, said transversely extending surface comprising an end surface.

\* \* \* \* \*